United States Patent [19]

Farber

[11] 4,012,364
[45] Mar. 15, 1977

[54] VINYL COPOLYMERS CROSS-LINKED WITH ALLYL DIGLYCOL CARBONATE

[75] Inventor: Elliott Farber, St. Louis Park, Minn.
[73] Assignee: La Maur Inc., Minneapolis, Minn.
[22] Filed: May 19, 1975
[21] Appl. No.: 578,537
[52] U.S. Cl. .................. 260/77.5 D; 260/77.5 R; 260/77.5 CR; 260/77.5 BB; 526/79; 526/212; 526/263
[51] Int. Cl.² ............ C08F 218/08; C08F 218/14; C08F 226/08
[58] Field of Search ............ 260/77.5 R, 77.5 D, 260/80.72, 78.5 BB, 77.5 CR

[56] References Cited
UNITED STATES PATENTS

| | | | |
|---|---|---|---|
| 3,006,900 | 10/1961 | Fikentscher et al. | 260/80.72 |
| 3,285,888 | 11/1966 | Brown et al. | 260/80.72 |
| 3,405,084 | 10/1968 | Bohac et al. | 260/80.72 |
| 3,806,317 | 4/1974 | Viout et al. | 260/80.72 |
| 3,829,407 | 8/1974 | McKillip et al. | 260/77.5 R |
| 3,864,299 | 2/1975 | Kolb | 260/77.5 R |
| 3,880,813 | 4/1975 | Guse et al. | 260/77.5 R |

*Primary Examiner*—H.S. Cockeram

[57] ABSTRACT

The new film forming polymeric material is useful in coating, binder, adhesive, and thickening applications. It comprises the addition free-radical polymerization product formed by polymerizing a monomeric mixture consisting essentially of, by weight percent: 1 to 20% of 1,1 dimethyl-1,(2-hydroxypropyl) amine methacrylimide; 8 to 45% of N-vinyl pyrrolidone; and 35 to 89% of vinyl acetate. Solvent polymerization in acid media is preferred. Polymerization in the presence of a small amount of cross-linking agent (such as allyl diglycol carbonate) improves the resistance of the resulting product to softening under high humidity conditions, preferably without destroying its solubility in ethanol.

16 Claims, No Drawings

VINYL COPOLYMERS CROSS-LINKED WITH ALLYL DIGLYCOL CARBONATE

This invention relates to new film forming polymeric material, and more particularly to polymeric material such as formed by polymerizing 1,1 dimethyl-1,(2-hydroxypropyl) amine methacrylimide, N-vinyl pyrrolidone, and vinyl acetate.

The most pertinent known prior art is set forth in the following United States Letters Patents, none of which teaches the new polymeric material hereof: Grosser et al 3,222,329; Barabas et al 3,686,150; Viout et al 3,743,715; Barabas et al 3,803,104; and Basset et al 3,804,881.

Polymeric material of varied type as prepared according to the teachings herein is useful, for example, as a coating, a binder, an adhesive, or a thickening agent.

The new film forming polymeric material comprises the addition free-radical polymerization product formed by polymerizing a monomeric mixture consisting essentially of, by weight percent: 1 to 20% of 1,1 dimethyl-1,(2-hydroxypropyl) amine methacrylimide, 8 to 45% of N-vinyl pyrrolidone; and 35 to 89% of vinyl acetate.

Addition free-radical polymerization can be accomplished under various conditions; solution, suspension, emulsion or bulk polymerization processes are useful. In order to achieve coatings or films of high clarity or freedom from haziness, the polymeric material should be prepared in such a way as to cause the monomers to be as repetitively regular in its chain as possible. Thus, the solution polymerization process is preferred over others. An alcoholic solvent media in which the monomers to be polymerized are soluble or miscible, and in which the resulting polymerization product is also soluble, is preferred; and ethanol is the preferred alcohol to employ. The ethyl alcohol known as "SD alcohol 40" is useful and contains a nominal few percent of ingredients for a denaturant function (i.e., tertiary butyl alcohol and brucine sulfate). Miscible mixtures of ethanol and a small amount of other volatile liquid, or several other volatile liquids (including water), are useful. The term "ethanolic" is used herein to include vehicles consisting essentially of ethanol as well as those ethanol-containing miscible mixtures in which the monomers are soluble.

Polymerization is most desirably and easily accomplished under acid conditions, or with an acid added to the media of solvent polymerization, such that the pH of the media is between about 1.5 and 6.5, and generally around 5. A few illustrative useful acids to employ are adipic acid, acetic, benzoic, glutamic, boric, citric, oxalic, hydrochloric, fumaric, sulfuric, nitric, glycolic, succinic, and mixtures or combinations thereof. Adipic acid alone or acetic acid alone, or in combination with each other, or with other acids, is most preferred. The acid is used up or changed during polymerization, and becomes a part of the resulting polymer, not necessary as a link in the chain thereof, but as a radical attracted or united to sites (such as at the amine-imide nitrogens) on the 1,1 dimethyl-1,(2-hydroxypropyl) amine methacrylimide in the polymerization product. Thus, the acids can be said to cause the formation of an acid salt of that monomeric portion or unit; and the effect is the formation of an acid salt of that unit in the resulting polymer. Therefore, the polymerization product might be looked upon as that formed by addition free-radical polymerization of 1,1 dimethyl-1,(2-hydroxypropyl) amine methacrylimide, or equivalent—such as, an acid salt of it—with the N-vinyl pyrrolidone and the vinyl acetate of the monomeric mixture. Acids, when present, are considered herein to be a part of the reactable monomeric mixture, and may account for up to 20% of that mixture (but usually not over about 10% thereof).

A slight amount of cross-linking in the resulting polymer is sometimes desirable, and increases the average molecular weight. A polyunsaturated monomer serving as a cross-linking agent is suitably added to the solvent media in which polymerization is accomplished. The very small amount used (less than one part by weight, based on 100 parts by weight of monomeric mixture) is dependent on its reactivity in the particular process conditions employed, and is that amount which effects sufficient crosslinking in the resulting polymerization product to increase its resistance to softening under high humidity conditions, as compared to the properties of a separate or second polymerization product identically formed except that the cross-linking agent is omitted. But the amount of cross-linking desired in the polymerization product is limited by solubility requirements. In general, the cross-linking must not be sufficient to cause the resulting product to form a gel in ethanolic vehicles in which an otherwise identical polymer, formed without a cross-linking agent, is soluble. In a very real sense, the amount of cross-linking employed is preferably insufficient to destroy solubility in ethanol. Suitable cross-linking agents are diallyl maleate, triallyl isocyanurate, triallyl cyanurate, allyl diglycol carbonate, diallyl fumarate, ethylene glycol dimethacrylate, and mixtures thereof. Of these, the most preferred is allyl diglycol carbonate. Although cross-linking agents frequently are used up as cross-linking is accomplished, and thus become a part of the resulting polymer, they are not considered to be part of this monomeric mixture in terms of calculating the weight percent thereof because of their specialized function and because of their almost negligible presence when calculated as phm (described hereinafter).

Polymerization is most preferably accomplished by incremental addition of at least the majority (over half, up to 90% or even more) of the N-vinyl pyrrolidone to the remaining parts of the monomeric mixture during the polymerization step. As noted above, the most desirable polymers for some uses are those which have a regular or relatively uniform repetitive pattern of monomer distribution. Achieving this result is difficult and is enhanced when the monomer having the highest reactivity ratio, namely N-vinyl pyrrolidone, is incrementally added. The clarity and sparkle of coatings or films of the polymeric material is improved as the uniformity of the comonomer distribution in the resulting copolymers is improved.

Further, for ease of preparation of polymeric material having the most useful and practical combination of properties for such uses as aforenoted, especially the ease of achieving uniformity of monomer distribution, the three primary constituents of the monomeric mixture are employed within the following more limited approximate ranges of weight percent: between 3% and 15% (or preferably no more than 12%) of 1,1 dimethyl-1,(2-hydroxypropyl) amine methacrylimide; between 10% (or preferably at least 15%) and 35% of N-vinyl pyrrolidone; and between 45% (or preferably at least 50% or even 55%) and 82% of vinyl acetate.

A few illustrative non-limiting examples of the preparation of the new thermoplastic polymeric material are set forth below. Also discussed below are several valuable properties of the new material. To be stressed is that the percentage ranges for the monomers to be polymerized should always lie within approximate weight ranges as follows: from 1 to 20% of 1,1-dimethyl-1,(2-hydroxypropyl) amine methacrylimide (or its acid salt); 8 to 45% of N-vinyl pyrrolidone, and 35 to 89% of vinyl acetate. It is within these ranges that water insolubility (in water alone) of the resultant polymeric material occurs—a property of considerable value for protective coatings.

Resultant polymers are resistant to softening at high humidites and can be improved in that property by cross-linking, as aforenoted. Although insoluble in water, they nevertheless, except when excessively cross-linked, are dispersible in water of varied pH (including both acid and alkaline; that is, a pH other than 7) without forming a gummy precipitate. This property is valuable for removal of some coatings. Further, except in cases of excessive cross-linking, they are soluble in low cost volatile vehicles or solvents such as the alcohols, especially ethanol, and can be concentrated to a relatively high solids content. This reduces the quantity of solvent to be evaporated after a coating step and is of considerable importance in fighting pollution. The property is useful in forming adhesive coatings as well as protective or preservative coatings, whether transparent or otherwise. It also is of value when the polymeric material is used as a binder for inks or other pigments (especially printing inks), or as the binder phase for matrices (especially printing matrices formed by the slurry method and containing reinforcing materials such as filaments or fibers).

The polymeric materials adhere well to paper, wood, metal and other surfaces when applied by solution coating and evaporation of solvent. At elevated temperatures, such as those on the order of 60° C or slightly more, the material is altered (that is, it melts), and its adhesive or cohesive properties are substantially lost or very seriously weakened. This makes for utility in industrial applications where weakening of binder or adhesive properties is desirably accomplished at elevated temperatures. For example, the property may be used to aid in removing adhesively affixed labels on jars or other containers which are re-used by the food and drink industries. Heat weakenable water insoluble binders or adhesives also are useful in manufacturing operations where temporary adherence between elements is desired but is to be heat terminated at a predetermined point.

If desired, thermoplastic film forming polymeric materials such as illustrated by the examples can be subsequently altered to a thermoset condition, as by reacting their hydroxy moieties with reagents containing chemical groups reactive therewith (such as, for example, isocyanates, acids, anhydrides, methoxymethyl, and melamines).

Polymerization to form the polymeric materials of the examples can be initiated by the usual sources of free-radical initiators such as peroxides, persulfates, peroxypivalates, percarbonates, azobisisobutyronitrile, azobisisovaleronitrile, and the like—by themselves or in combination with one another. The invention is not to be limited to any particular free-radical initiator system, or cross-linking agent, or reaction temperature. Initiator concentration, reaction temperature, as well as the use of polyunsaturated monomers for cross-linking can alter molecular weight; and this effect may be used similar to its use in other processes to change product properties related to molecular weight. Further, chain terminators such as carbon tetrachloride, dodecyl mercaptan and the like may be added to reduce the average molecular weight of the resin, if this is desired, provided the resultant polymer in dried condition is a solid (or non-liquid) of film-forming or thermoplastic character.

In the following examples, the amount of each ingredient is specified in parts by weight (or weight percent) per 100 parts of monomers or polymerizable components of the monomeric mixture (i.e., per hundred monomer, phm). Thus, the total of the parts or percentages by weight for the ingredients making up the monomeric mixture equals 100; and the quantity of other ingredients (such as solvent, catalyst, and cross-linking agent) are specified in terms of the amount or percent which their weight bears to the 100 weight parts or weight percent for the monomeric mixture.

Solution polymerization was used in the following examples. "Solvent" refers to the alcoholic (ethanolic) solvent media. "Initiator" refers to Vazo 64 (azobisisobutyronitrile) of E.I. duPont de Nemours, Inc., Wilmington, Delaware. "Cross-linking agent" refers to allyl diglycol carbonate. "Amine-imide" is an abbreviation used to refer to 1,1 dimethyl-1,(2-hydroxypropyl) amine methacrylimide.

In all of the following examples of polymerization, the ingredients listed in tabular form were batch charged initially into an agitated reactor at room temperature. The contents were agitated until the solvent dissolved the other ingredients of the tabulation to form a uniform or homogeneous mixture. Further processing conditions are specified for each example.

Example 1

| Material | phm |
|---|---|
| Amine-imide | 10.00 |
| N-vinyl pyrrolidone | 2.50 |
| Adipic acid | 5.00 |
| Vinyl acetate | 75.00 |
| Initiator | 0.26 |
| Solvent | 61.00 |

The Beckman pH value of this system at room temperature was 4.0. The contents were continuously purged with nitrogen and heated to 68° C. After 2 hours at 68° C, incremental addition of 7.5 phm of N-vinyl pyrrolidone was started and accomplished at the rate of 1.25 phm per hour, with the addition completed after 6 hours. After a total reaction time of 18 hours, analysis of the solids content indicated a conversion of 96% of monomers to polymer.

Example 2

| Material | phm |
|---|---|
| Amine-imide | 10.00 |
| N-vinyl pyrrolidone | 4.10 |
| Adipic acid | 5.00 |
| Vinyl acetate | 70.00 |
| Initiator | 0.45 |
| Solvent | 63.00 |

The system was heated under a continuous nitrogen purge to a reaction temperature of 60° C. Then, after 2 hours at 60° C, incremental addition of 10.9 phm of N-vinyl pyrrolidone was initiated at a rate of 1.4 phm per hour, and completed after 8 hours. After 20 hours of reaction, 97% of the monomers were found to be converted to polymer.

Example 3

| Material | phm |
|---|---|
| Amine-imide | 5.00 |
| Adipic acid | 2.50 |
| N-vinyl pyrrolidone | 4.80 |
| Vinyl acetate | 65.00 |
| Initiator | 0.34 |
| Solvent | 60.50 |

The system was purged with nitrogen and heated to a reaction temperature of 68° C. After 3 hours at reaction temperature, incremental addition of 22.7 phm of N-vinyl pyrrolidone was started at a rate of 7 phm so hat addition was complete in about 3 hours and 20 minutes. After a total reaction time of 12 hours, analyses indicated 99% converstion of monomers to polymer.

Example 4

| Material | phm |
|---|---|
| Amine-imide | 5.00 |
| N-vinyl pyrrolidone | 4.80 |
| Adipic acid | 2.50 |
| Vinyl acetate | 65.00 |
| Initiator | 0.23 |
| Solvent | 60.50 |

The above materials were purged with nitrogen, and brought to a reaction temperature of 68° C. Incremental addition of 22.7 phm of N-vinyl pyrrolidone was begun 1 & ½ hours after the start of the reaction. Uniform incremental addition was completed with 3 hours and 20 minutes; i.e., at a rate of 7 phm/hour. The total reaction time at 68° C was 12 hours, giving 96% conversion of monomers to polymer.

Example 5

| Material | phm |
|---|---|
| Amine-imide | 5.00 |
| Adipic acid | 2.50 |
| N-vinyl pyrrolidone | 4.80 |
| Vinyl acetate | 65.00 |
| Cross-linking agent | 0.10 |
| Initiator | 0.23 |
| Solvent | 60.50 |

The system was purged with nitrogen and brought to its reaction temperature of 68° C. After 1 & ½ hours at reaction temperature, 22.7 phm of N-vinyl pyrrolidone was added at the rate of 7.0 phm/hour. The total reaction time was 12 hours, giving 96% conversion of monomers to polymer.

Example 6

| Material | phm |
|---|---|
| Amine-imide | 5.00 |
| Adipic acid | 2.50 |
| N-vinyl pyrrolidone | 4.80 |
| Vinyl acetate | 65.00 |
| Cross-linking agent | 0.15 |
| Initiator | 0.20 |
| Solvent | 60.50 |

The system was purged with nitrogen to remove oxygen and heated to 68° C. 1 hour and 45 minutes after the reaction temperature was obtained, incremental addition of 22.7 phm of N-vinyl pyrrolidone was started at a rate of 5.7 phm/hour. The total reaction time was 12 hours, giving 96% conversion of monomers to polymer.

Example 7

| Material | phm |
|---|---|
| Amine-imide | 5.00 |
| N-vinyl pyrrolidone | 4.80 |
| Vinyl acetate | 67.50 |
| Cross-linking agent | 0.15 |
| Initiator | 0.20 |
| Solvent | 60.50 |

The system was purged with nitrogen and brought to 68° C. Then, after 1 hour and 45 minutes, incremental addition of 22.7 phm of vinyl pyrrolidone was initiated at a rate of 5.7 phm/hour. The total reaction time was 12 hours, at which time 96% conversion of monomer to polymer was noted.

PRODUCT EVALUATION

The clarity and resistance to humidity of the polymerization products were determined on films cast from a 5% solids solution, using SD Alcohol 40 as the diluent. A 7 mil thick film was cast on a clean glass plate by the use of a "draw-down" blade supplied by the Gardner Instrument Company, Bethesda, Maryland.

The clarity of the dried films was rated as either hazy or clear. If there was any noticeable degree of haze to the film, it was rated as hazy. Table 1 lists the results.

Table 1

| Example | Clarity |
|---|---|
| 1 | Clear |
| 2 | Clear |
| 3 | Hazy |
| 4 | Clear |
| 5 | Clear |
| 6 | Clear |
| 7 | Clear |

The clarity of the films from Examples 1 and 2 illustrates that when 10 phm of 1,1 dimethyl-1,(2-hydroxypropyl) amine methacrylimide is used, a clear film is obtained under varying conditions of incremental addition of N-vinyl pyrrolidone and of initiator concentration. The haze of Example 3 compared to the clarity of Example 4 illustrates the sensitivity of the degree of clarity and the copolymer uniformity on the initiator concentration and on the start and rate of the incremental addition of vinyl pyrrolidone. Examples 5 and 6 show that, when a small amount of a cross-linking agent is present, the film clarity is unaffected, provided the cross-linking agent is used at sufficiently low concentration so that no gel or insoluble copolymer fractions are formed. Furthermore, Examples 3 to 7 show how the start and rate of incremental addition of the fastest polymerizing monomer, i.e., N-vinyl pyrrolidone, is to be altered to gain clarity as initiator concentration is changed.

Cast films prepared as aforenoted were air dried for 2 hours and then placed in a humidity box kept at 78% relative humidity. After 10 minutes exposure in the humidity box, the Sward Hardness value (Sward Hardness Rocker, Model C, Gardner Labs., Bethesda, Maryland) was determined. (Sward Hardness is measured by the number of times a precise calibrated metallic rocker can move on the surface of the film. As humidity affects the film, it becomes soft and the resistance offered to the rocker increases until movement of the rocker is slowed and ultimately stopped.) The relatively high and desirable Sward Hardness values for the foregoing Examples are shown in Table II, together with the values for other known resins for comparative purposes.

Table II

| Example | Sward Hardness Value |
|---|---|
| 1 | 19 |
| 2 | 20 |
| 3 | 21 |
| 4 | 20 |
| 5 | 25 |
| 6 | 25 |
| 7 | 25 |
| Resin A (GAF-735 Copolymer) | 15 |
| Resin B (National Starch Resin 28-1310) | 17 |
| Resin C (GAF-335 Copolymer) | 19 |

The 1,1 dimethyl-1,(2-hydroxypropyl) amine methacrylimide structure is shown below:

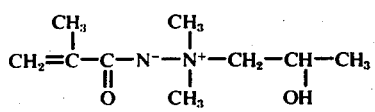

The polar charges of the amine-imide nitrogens produce an attractive force; and the teachings of this invention and the scope of the claims hereof are to be interpreted in the broad sense to include the use of equivalent monomers having this amine-imide force. Such polar attraction is believed to be at least partially responsible for the high humidity resistance of these resins. The polar charges also are believed to act to neutralize and/or resist the build-up of static electrical charges.

While the invention is disclosed above with as much precision as possible in view of the nature of the subject matter, it is to be recognized that equivalents of specifically recited matter are likewise contemplated and intended, and that the claims are to be construed to comprehend the same.

That which is claimed is:

1. Film-forming polymeric material comprising the addition free-radical polymerization product formed by polymerizing a monomeric mixture consisting essentially of, by weight percent: 1 to 20% of 1,1 dimethyl-1,(2-hydroxypropyl) amine methacrylimide; 8 to 45% of N-vinyl pyrrolidone; and 35 to 89% of vinyl acetate.

2. Polymeric material according to claim 1 wherein said polymerization product is formed by solution polymerization of said monomers in an alcoholic medium.

3. Polymeric material according to claim 2 wherein said media contains an acid such that the pH of said medium is between about 1.5 and 6.5.

4. Polymeric material according to claim 3 wherein said acid comprises adipic acid.

5. Polymeric material according to claim 3 wherein said acid comprises acetic acid.

6. Polymeric material according to claim 1 wherein said polymerization product is formed in the presence of a polyunsaturated monomeric cross-linking agent, said agent being present in an amount (i) which effects sufficient cross-linking in said polymerization product to increase its resistance to softening by humidity, as compared to a second polymerization product otherwise identically formed but without said cross-linking agent, and (ii) which does not effect sufficient cross-linking in said polymerization product to cause it to form a gel in ethanol.

7. Polymeric material according to claim 6 wherein said cross-linking agent is selected from the group consisting of diallyl maleate, triallyl isocyanurate, triallyl cyanurate, allyl diglycol carbonate, diallyl fumarate, ethylene glycol dimethacrylate, and mixtures thereof.

8. Polymeric material according to claim 6 wherein said cross-linking agent comprises allyl diglycol carbonate.

9. Polymeric material according to claim 1 wherein said polymerization product is formed by solution polymerization with at least the majority of the weight of said N-vinyl pyrrolidone incrementally added to the remaining part of said monomeric mixture during polymerization.

10. Polymeric material according to claim 1, wherein said monomeric mixture additionally includes up to 20% by weight of an acid selected from the group consisting of acetic, benzoic, glutamic, adipic, boric, citric, oxalic, hydrochloric, fumaric, sulfuric, nitric, glycolic, succinic, and mixtures thereof, said acid being united with said polymerization product at sites on the said monomer identified as 1,1 dimethyl-1,(2-hydroxypropyl) amine methacrylimide, thereby forming an acid salt thereof.

11. Polymeric material according to claim 10 wherein said acid comprises adipic acid.

12. Polymeric material according to claim 10 wherein said acid comprises acetic acid.

13. Polymeric material according to claim 10 wherein said polymerization product is formed by solution polymerization with at least the majority of the weight of said N-vinyl pyrrolidone incrementally added to the remaining part of said monomeric mixture during polymerization.

14. Polymeric material according to claim 13 wherein said polymerization product is cross-linked (i) sufficiently to increase its resistance to softening under humidity, as compared to a second polymerization product otherwide identically formed but for said cross-linking, and (ii) insufficiently to destroy the solubility of said polymerization product in ethanol.

15. Polymeric material according to claim 1 wherein said 1,1 dimethyl-1,(2-hydroxypropyl) amine methacrylimide is present in said polymerization product in the form of an acid salt thereof, the acid forming said salt being selected from the group consisting of acetic, benzoic, glutamic, adipic, boric, citric, oxalic, hydrochloric, fumaric, sulfuric, nitric, glycolic, succinic, and mixtures thereof.

16. Polymeric material according to claim 1, wherein the weight percent of said monomers lies in the following approximate ranges: between 3 and 15% of 1,1 dimethyl-1,(2-hydroxypropyl) amine methacrylimide; between 10 and 35% of N-vinyl pyrrolidone; and between 45 and 82% of vinyl acetate.

* * * * *